United States Patent
Walls et al.

(10) Patent No.: US 7,284,274 B1
(45) Date of Patent: Oct. 16, 2007

(54) SYSTEM AND METHOD FOR IDENTIFYING AND ELIMINATING VULNERABILITIES IN COMPUTER SOFTWARE APPLICATIONS

(75) Inventors: Thomas J. Walls, East Setauket, NY (US); Viren Shah, Ashburn, VA (US); Anup K. Ghosh, Centreville, VA (US)

(73) Assignee: Cigital, Inc., Dulles, VA (US)

( * ) Notice: Subject to any disclaimer, the term of this patent is extended or adjusted under 35 U.S.C. 154(b) by 682 days.

(21) Appl. No.: 10/050,764

(22) Filed: Jan. 18, 2002

Related U.S. Application Data

(60) Provisional application No. 60/262,085, filed on Jan. 18, 2001.

(51) Int. Cl.
*G06F 15/18* (2006.01)

(52) U.S. Cl. .......................... 726/25; 726/22

(58) Field of Classification Search ................ 713/201; 726/25
See application file for complete search history.

(56) References Cited

U.S. PATENT DOCUMENTS

| | | | | |
|---|---|---|---|---|
| 4,924,408 A | * | 5/1990 | Highland | 706/60 |
| 4,941,102 A | * | 7/1990 | Darnell et al. | 706/60 |
| 5,132,972 A | * | 7/1992 | Hansen | 714/38 |
| 5,133,045 A | * | 7/1992 | Gaither et al. | 706/46 |
| 5,247,693 A | * | 9/1993 | Bristol | 717/139 |
| 5,293,629 A | * | 3/1994 | Conley et al. | 717/154 |
| 5,500,941 A | * | 3/1996 | Gil | 714/38 |
| 5,581,696 A | * | 12/1996 | Kolawa et al. | 714/38 |
| 5,699,507 A | * | 12/1997 | Goodnow et al. | 714/38 |
| 5,761,408 A | * | 6/1998 | Kolawa et al. | 714/38 |
| 5,784,553 A | * | 7/1998 | Kolawa et al. | 714/38 |
| 5,842,019 A | * | 11/1998 | Kolawa et al. | 717/130 |
| 5,850,516 A | * | 12/1998 | Schneier | 726/25 |
| 5,854,924 A | * | 12/1998 | Rickel et al. | 717/132 |
| 5,860,011 A | * | 1/1999 | Kolawa et al. | 717/142 |
| 5,922,079 A | * | 7/1999 | Booth et al. | 714/26 |
| 5,925,123 A | * | 7/1999 | Tremblay et al. | 712/212 |
| 5,970,242 A | * | 10/1999 | O'Connor et al. | 717/100 |
| 6,014,723 A | * | 1/2000 | Tremblay et al. | 711/1 |
| 6,085,029 A | * | 7/2000 | Kolawa et al. | 714/38 |
| 6,125,439 A | * | 9/2000 | Tremblay et al. | 712/202 |
| 6,148,401 A | * | 11/2000 | Devanbu et al. | 713/170 |
| 6,154,876 A | * | 11/2000 | Haley et al. | 717/133 |
| 6,381,698 B1 | * | 4/2002 | Devanbu et al. | 713/170 |

(Continued)

OTHER PUBLICATIONS

D. Wagner, J. Foster, E. Brewer, and A. Aiken. A first step towards automated detection of buffer overrun vulnerabilities. In Network and Distributed System Security Symposium, San Diego, CA, Feb. 2000.*

(Continued)

*Primary Examiner*—Nasser Moazzami
*Assistant Examiner*—David Garcia Cervetti
(74) *Attorney, Agent, or Firm*—Edell, Shapiro & Finnan, LLC

(57) ABSTRACT

A system and method for certifying software for essential and security-critical systems. The system and method provide a methodology and corresponding analysis engines increase the level of confidence that common vulnerabilities are not present in a particular application. A pipeline system consisting of independent modules which involve increasingly complex analysis is disclosed. The pipeline approach allows the user to reduce computation time by focusing resources on only those code segments which were not eliminated previously in the pipeline.

11 Claims, 2 Drawing Sheets

U.S. PATENT DOCUMENTS

| | | | |
|---|---|---|---|
| 6,412,071 B1* | 6/2002 | Hollander et al. | 726/23 |
| 6,427,232 B1* | 7/2002 | Ku et al. | 717/124 |
| 6,473,896 B1* | 10/2002 | Hicken et al. | 717/132 |
| 6,513,154 B1* | 1/2003 | Porterfield | 717/101 |
| 6,578,094 B1* | 6/2003 | Moudgill | 710/57 |
| 6,584,569 B2* | 6/2003 | Reshef et al. | 726/25 |
| 6,718,485 B1* | 4/2004 | Reiser | 714/38 |
| 6,806,893 B1* | 10/2004 | Kolawa et al. | 715/848 |
| 6,807,569 B1* | 10/2004 | Bhimani et al. | 709/217 |
| 6,862,696 B1* | 3/2005 | Voas et al. | 714/38 |
| 6,895,578 B1* | 5/2005 | Kolawa et al. | 717/130 |
| 2001/0013094 A1* | 8/2001 | Etoh et al. | 712/227 |
| 2002/0026591 A1* | 2/2002 | Hartley et al. | 713/201 |
| 2003/0233581 A1* | 12/2003 | Reshef et al. | 713/201 |
| 2004/0006704 A1* | 1/2004 | Dahlstrom et al. | 713/200 |
| 2004/0103315 A1* | 5/2004 | Cooper et al. | 713/201 |

OTHER PUBLICATIONS

Necula et al., The design and implementation of a certifying compiler, 1998, ACM, pp. 333-344.*

Bush et al., A static analyzer for finding dynamic programming errors, 2000, Software Practice and Experience, pp. 775-802.*

Viega, J.; Bloch, J.T.; Kohno, Y.; McGraw, G., ITS4: a static vulnerability scanner for C and C++ code, Dec. 2000, IEEE, pp. 257-267.*

D. Wagner, J. Foster, E. Brewer, and A. Aiken. A first step towards automated detection of buffer overrun vulnerabilities. In Network and Distributed System Security Symposium, San Diego, CA, Feb. 2000.*

Necula et al., The design and implementation of a certifying compiler, 1998, ACM, pp. 333-344.*

Bush et al., A static analyzer for finding dynamic programming errors, 2000, Software Practice and Experience, pp. 775-802.*

Viega, J.; Bloch, J.T.; Kohno, Y.; McGraw, G., ITS4: a static vulnerability scanner for C and C++ code, Dec. 2000, IEEE, pp. 257-267.*

Ghosh et al., An Approach for Certifying Security in Software Components, 1998, Proc. 21st {NIST}-{NCSC} National Information Systems Security Conference, <citeseer.ist.psu.edu/104720.html>.*

Ghosh, A.K.; O'Connor, T.; McGraw, G., An automated approach for identifying potential vulnerabilities in software, 1998, Security and Privacy, 1998. Proceedings. 1998 IEEE Symposium on, May 3-6, 1998 pp. 104-114.*

* cited by examiner

SYSTEM AND METHOD FOR IDENTIFYING AND ELIMINATING VULNERABILITIES IN COMPUTER SOFTWARE APPLICATIONS

This application claims the benefit of U.S. Provisional Application No. 60/262,085, filed Jan. 18, 2001, which is herein incorporated by reference in its entirety.

This invention was made with Government support under Cooperative Agreement No. 70NANB7H3049 administered by the National Institute for Standards and Technology. The Government has certain rights in the invention.

BACKGROUND

1. Field of the Invention

The present invention relates generally to computer system security, integrity, and reliability. More particularly, the present invention relates to examination and certification of software application programs to identify and eliminate vulnerabilities arising from poor software application programming techniques.

2. Background of the Invention

The explosion of electronic commerce has placed computer software applications at the cornerstone position of on-line business. Software is the brick and mortar of the new economy, but the migration from physical to virtual retail space has placed both the consumer and vendor at risk in unforeseen ways. If the new economy is going to survive, software will have to become more resistant to attack and will have to continuously improve to meet the rigorous demands of an on-line market.

An example of the magnitude of the problems faced by software users is illustrated by the distributed denial-of-service (dDoS) attacks against major e-commerce sites of February, 2000. Some of the brightest luminaries in e-commerce, including Yahoo!, Amazon.com, Buy.com, ZDNet, and CNN.com were effectively taken down for a period of hours by these attacks. What is most impressive and disturbing about these attacks is that they were against very high volume sites. For instance, according to Media Metrix, an online traffic measurement firm, Yahoo! had more unique visitors in January 2000 than any other online site. The other victims were among the top fifty sites. The dDoS attacks were able to bombard these sites with data at rates of up to one gigabit of data per second. The collective downtime of these sites resulted in a loss of revenue estimated to be in the millions of U.S. dollars.

Though denial-of-service (DoS) attacks often exploit weaknesses in protocols to hold network services hostage to the attacks, what is often overlooked by analysts is that such dDoS attacks are often made possible by flaws in software. A key to implementing an effective dDoS attack is to compromise a very large number of machines in order to plant the dDoS attack software, which, in the February attacks, went by names such as Trinoo or TFN2000. Sites are usually compromised in the first place by exploiting some flaw in software. In the case of many dDoS attacks, Unix servers are compromised, often by a well-known flaw in the Remote Procedure Call (RPC) service. Once a site is compromised and the malicious software installed, the compromised site becomes a zombie that acts maliciously on command at some future time. One of the keys to preventing these types of attacks in the future is to secure the software on the server systems such that they are not vulnerable to compromise in the first place.

In any e-commerce site, the software that runs the site is business-critical by definition. The failure of the software under any conditions, including normal operation, as well as unusual or attack conditions, can result in immediate loss of revenue, as well as jeopardizing the long-term viability of the business. For instance, well-known flaws in CGI scripts have enabled hackers to alter Web pages with political messages. If the Web pages of a financial investment firm were vandalized, investors and Wall Street would likely lose confidence in the ability of the firm to securely manage the assets of firm's investors.

For companies that develop and release application software, the expense in adequately addressing security vulnerabilities is very high. Moreover, for any vulnerabilities that were not adequately foreseen, there will be a corresponding drop in consumer confidence which cannot be measured. For example, both Netscape and Microsoft experienced well-publicized security-related flaws in their Internet browsers in 1997.

Developers of operating systems such as Sun Microsystems and Hewlett-Packard also spend considerable human resources tracking bugs that have the potential to be security flaws in their commercial operating systems. Such costs are often transferred to the end users, either directly (in the form of increased software prices) and indirectly (in the form of increased maintenance costs). It is well-known that the time and expense involved for system administrators to patch, upgrade, and maintain the security of computer systems is very high and increases with both new software additions and more sophisticated attacks.

The buffer overrun attack is one of the most pervasive modes of attack against computer systems today. Probably the most infamous buffer overrun attack is the Morris worm of 1988 that resulted in the shutdown of a significant portion of the Internet infrastructure at the time (which consisted of primarily university and government nodes). The worm was a self-propagating buffer overrun attack that exploited a program vulnerability in the Unix fingerd network service. The worm illustrated the serious nature of software flaws and how they can be leveraged to breach security on other systems.

Since the Morris worm, buffer overrun attacks have become a very popular method of breaking into systems or obtaining super user privilege from user-level accounts. According to statistics released by the Computer Emergency Response Team (CERT) Coordination Center of Carnegie Mellon University's Software Engineering Institute, about 50 percent of computer incidents reported today in the field involve some form of buffer overrun.

To further complicate the problems presented with application software, unsafe languages, such as C, make buffer overflow attacks possible by including standard functions, such as, for example, gets, strcat, and strcpy, that do not check the length of the buffer into which input is being copied. If the length of the input is greater than the length of the buffer into which it is being copied, then a buffer overflow can result. Safe programming practices that allow only constrained input can prevent a vast majority of buffer overflow attacks. However, many security-critical programs already in the field today do not employ safe programming practices. In addition, many of these programs are still coded in commercial software development labs in unsafe languages today.

As described above, buffer overrun attacks are made possible by program code that does not properly check the size of input data. When input is read into a buffer and the length of the input is not limited to the length of the buffer allocated in memory, it is possible to run past the buffer into critical portions of the stack frame. Overrunning the buffer results in writing to memory that is not reserved exclusively for the buffer. The consequences of overrunning a buffer can range from no discernible effect to failure of the program execution, and even to execution of machine instructions contained in the input. If the unconstrained input can write over specific data in the program stack frame, then it may be possible to execute arbitrary program code included in the input.

The stack frame is the part of a process' address space that is used to keep track of local function data when a function is called. When calling a function, a new stack frame is created for the function that is called. The calling function "pushes" the address of the next instruction to be executed after returning from the called function on this stack. This address is known as the return instruction pointer. After the program finishes executing the called function, a pointer to the next instruction to be executed is "popped off" the stack. The value of the operation code (opcode) pointed to by the instruction pointer is loaded and that instruction is executed.

By overwriting a buffer allocated on the stack, it is possible to change the instruction pointer to point to another address. In the case of many program crashes caused by buffer overruns, the instruction pointer is overwritten with random or garbage data that does not correspond to a legitimate instruction address. Upon returning from the called function, the processor attempts to execute an invalid instruction and an exception is generated. In this case, the program will normally abort execution, usually (but not always) without serious consequence on security, safety or integrity.

On the other hand, if the input stream that overruns the buffer is carefully crafted, it is possible that the instruction pointer can be overwritten in a principled manner. That is, a specific address can be written into the instruction pointer so that when it is evaluated, the next instruction to be executed is located at an address in the stack frame. With the address pointing back into the stack, it is possible to execute any instructions embedded in the input stream that have been written into the stack.

The process to implement the buffer overrun is commonly known as "smashing the stack." An exemplary process for smashing the stack or overrunning buffers is illustrated in FIGS. 1A and 1B. Program 10 includes the function "MAIN" which defines array variable 12 (illustrated in FIG. 1B) with the label "LARGE." Array LARGE is defined with a length of two thousand bytes. After creating the array LARGE, function MAIN fills it with two thousands "X" characters, as shown in FIG. 1B. Next, function MAIN calls the function "OVERFLOW" with a pointer to array "LARGE" passed as an argument. In OVERFLOW, array variable 14, labeled "SMALL," is defined with a length of one hundred bytes (illustrated in FIG. 1C). The left side of FIG. 1D shows program stack 20 illustrating how memory is allocated when the OVERFLOW function is called in program 10. As shown in FIG. 1D, the array SMALL is allocated one hundred bytes, represented by block 22. After SMALL, program stack 20 has memory reserved for the stack frame pointer (SFP) in block 24, the return instruction pointer (IP) in block 26, and the pointer (in block 28) that was pushed onto the stack when OVERFLOW was called. After creating array SMALL, the OVERFLOW function simply copies the contents of the array LARGE into the memory reserved for array SMALL using C's strcpy function.

Unfortunately, strcpy does not check the length of the source variable before copying it to the destination variable. As a result, the two thousand "X" characters are written into the one hundred character long array (block 22) and into the adjoining memory locations as shown in the right side of FIG. 1D. That is, after the first one hundred Xs are copied, the remaining nineteen hundred characters will overwrite the SFP, the return IP, and even the pointer.

After the OVERFLOW function finishes executing, the processor will pop off the return IP address and execute the instruction located at that address. In this example, the address pointed to by the integer value of X . . . X (length of pointer will depend on the system architecture) is probably not an instruction, and as a result, program 10 will probably crash. However array LARGE could have been intelligently loaded with input that places a meaningful address at the return IP location. After returning from the OVERFLOW function, the next instruction that will execute will be whatever instruction is stored in the address stored in the return IP location. If the attacker inserts instructions (i.e. code) into another location within the overrun buffer (i.e., boxes 22-28 or beyond), then the attacker could also insure the return IP location (box 226) then points to the location of his code and will be able to execute code of his own choice.

This technique is as effective as being able to access and modify the program source code, recompile it, and execute it without ever having access to the local source code. Smashing the stack is one of the primary attacks launched against SUID root programs, i.e., programs that run as the super user on UNIX-based systems. The problem illustrated in FIGS. 1A-1D was that a programming error allowed a large buffer to overwrite a smaller buffer. In the Figure it may seem fairly apparent that this would happen, but in many programs, the programmer is assuming that the user will input values well within the buffers allocated. However, no provision is made to handle input from a malicious or even careless user. The exploit was made possible in this case because the programmer used the strcpy function instead of some other function that would have performed bounds checking to prevent the data from being overwritten.

In the wake of many well-publicized online failures, such as those described herein, as well as failures of online trading firms to meet customer demands at critical times, one or more government agencies or other self-governing bodies may well institute new requirements on public firms whose financial health depends on their information technology (IT) systems. For example, regulatory bodies, such as the U.S. Securities and Exchange Commission (SEC), could require publicly-traded companies to issue audited statements on the ability of their IT systems to withstand unusual conditions, such as volatile market conditions, high consumer demand, as well as malicious attack.

Software certification is the process of analyzing software to determine whether or not the risks posed by the software are acceptable for a business critical environment. It is an assessment process that is acceptable in a business paradigm where software vendors can obtain independent, third party assurance that the vendor's software is reliable, safe, or secure in a given application.

To date, certification is largely performed on people and processes. Thus, a particular organization may be certified to produce commercial grade software by meeting an industry accepted standard for process maturity, such as the Software Engineering Institute's Capability Maturity Model (SEI-CMM) or International Standards Organization (ISO) 9000 standards. Similarly, individuals may be certified to work on particular hardware and software platforms. Examples are obtaining the Microsoft Certified Systems Engineer (MCSE) certification or obtaining Professional Engineer (PE) certification in a particular State to practice engineering. These certification processes are designed to encourage higher quality work and to provide some level of assurance to end users that the individual or organization is qualified to perform the job for which they are certified. However, none of these certifications actually certify the end product that results from the job.

Under existing certification programs, an end user may have some level of assurance that a particular individual or organization is qualified to produce quality software. However, there is little or no assurance that the resulting software is of high quality. Even SEI-CMM level 4 organizations (a very mature level on the SEI-CMM scale) can produce shoddy software, while same individuals with no explicit software engineering process can produce high quality software. Certifications of people and processes provide a good indicator for the expected quality of software but do not speak to the actual quality of the finished product.

In addition to certification of processes and people, a need exists for certification processes that certify the actual quality of software. Two major problems face software users and consumers alike: (1) a lack of sound metrics for quantifying that information systems are trustworthy, and (2) the absence of an organization (such as an Underwriter's Laboratory) to apply the metrics in order to assess trustworthiness. In fact, if such problems were solved, software vendors who sought to provide reliable products would also benefit due to a higher premium or larger customer-based that should result from the increased consumer confidence in the vendors' wares.

A number of different efforts have focused on identifying vulnerabilities in software or protecting systems from software vulnerabilities. For example, as an alternative to source code-based analysis, StackGuard, a gcc compiler variant for Linux developed by the Oregon Graduate Institute, attempts to protect buffers from stack smashing attacks by aborting the program if the return address pushed on the stack is overwritten. StackGuard can prevent stack smashing attacks from running arbitrary code embedded in user input, but will not protect programs against all buffer overflow attacks. For example, buffer overflow attacks that overwrite local variables that were never intended to be changeable by a user can result in security violations not prevented by StackGuard.

The Fuzz tool is another tool that can be used to identify and prevent overflow buffers, but it may produce inconclusive results. Because input is randomly generated, the vulnerability of the program executing user-defined code cannot fully be assessed. Similarly, the FIST tool implements specific fault injection functions that determine the program's vulnerability to specially-crafted buffer overflow attacks, but cannot protect against all buffer attacks.

Various run-time approaches have also been addressed. One such approach is dynamic interception of buffer overflows by using the libsafe library. While dynamic techniques can offer some level of run-time protection, they often incur a performance penalty. Dynamic approaches are also limited to buffer-overflow specific attacks and can make no claims about the overall security of the software. While a dynamic approach can offer a great safety-net, a static-analysis of the source code is preferable to assure that code is written in a safe and proper manner.

Another approach that has been examined is the ITS4 Security Scanner. ITS4 is a simple tool that statically scans C and C++ source code for potential security vulnerabilities. It is a command-line tool that works across Unix environments. ITS4 scans source code, looking for function calls that are potentially dangerous. ITS4 is not sufficient for identifying potential vulnerabilities because it is not context- or flow-sensitive and thus it is not possible for it to reduce the large number of potential vulnerability locations it identifies.

Another approach has been examined in the recent work in the static detection of buffer overflow vulnerabilities by David Wagner et al. of University of California, Berkeley. Wagner attempts to place provably maximal hounds on the properties of the arguments passed to library calls. Then, using that information one can determine whether or not certain heuristic policies have be violated. In the case of buffer overflows, Wagner reduces strings to be represented by two variables; all other information is abstracted away. This simple string representation allows an analyst to only focus on the string properties most important in detecting buffer overrun problems. The constraint language developed by Wagner is very powerful, but the scanning techniques taken in his approach are overly simplified and still lead to a large number of false positives.

Accordingly, a need therefore exists for systems and methods for providing certification for any essential software system, where the failure of that software may result in unacceptable losses, financial or otherwise.

SUMMARY OF THE INVENTION

The present invention provides a process for certification of software applied to essential software systems, such as those that run e-commerce sites. In particular, the present invention provides a process for certifying whether a software program is free from a common class of software flaws that are often leveraged into security violations. Embodiments of the present invention accommodate many other classes of security vulnerabilities, as well as other classes of software flaws that may have application in other essential software systems such as in safety-critical and high-reliability applications.

In an example, a specific embodiment of the present invention was used to analyze software for vulnerability to the most commonly exploited software flaw, the unconstrained buffer, which is exploited by the buffer overrun attack.

DETAILED DESCRIPTION OF THE INVENTION

The present invention provides a certification process for application software that enables organizations to deploy software in essential applications with greater confidence. By implementing a system and method for software certification according to the present invention a software vendor can ensure the software it releases is likely not to fail in a way that will compromise system security, safety, reliability, and other dependability properties.

The present invention provides a pipelined approach for certifying software wherein distinct components are assembled into a pipeline such that the results of one component are used as input for the next component.

Advantages of such a pipeline are two-fold. First, there is the advantage of pipelining the process where multiple components can be analyzed simultaneously. However, another major benefit is in the ability to use different accuracy levels for each stage of the pipeline. With conventional processes, it is usually the case that, in order to get higher degrees of precision in the results, a more computationally intensive algorithm is needed. Using such algorithms in the first stage would result in extensive computation times for processing the components. In contrast, a pipeline approach according to the present invention allows the use of progressively more complex algorithms chained together so that computationally cheaper algorithms are used to progressively filter out false positives in the results, and thus the more expensive algorithms can be used on a dramatically reduced subset of inputs, reducing the overall processing time significantly.

Figures 1A, 1B, 1C, 1D:
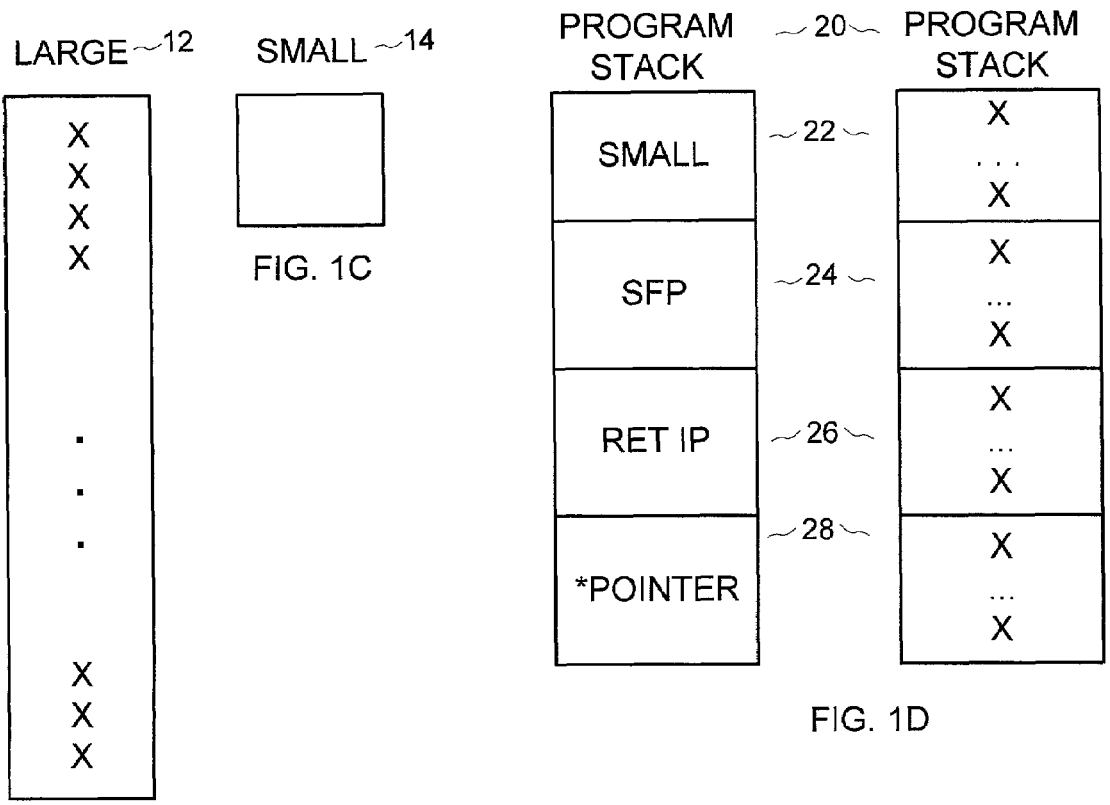
FIG. 1A shows a sample program that may be use to exploit the well-known buffer overflow vulnerability connected with the strcpy C function.
FIGS. 1B-1D are schematic diagrams showing how the program shown in FIG. 1A results in a buffer overrun.
Figure 2:
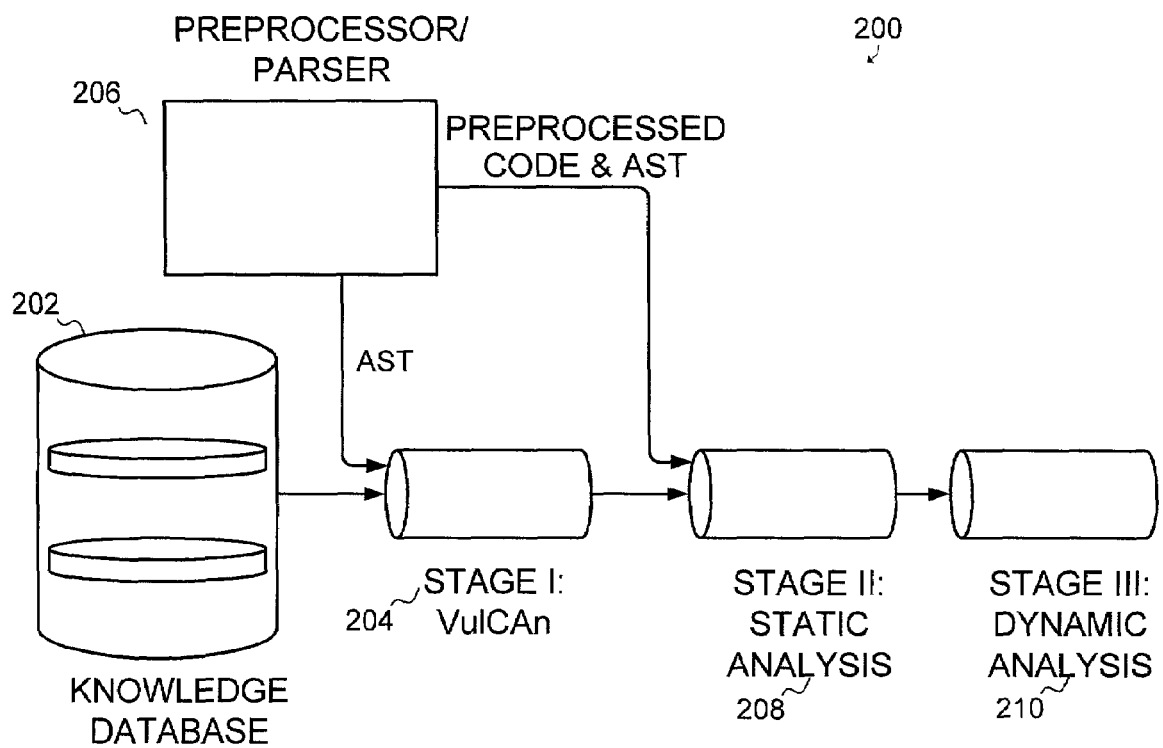
FIG. 2 is a schematic diagram showing the process flow for software analysis an certification in an embodiment of the present invention.

A pipeline implemented according to the present invention is illustrated in FIG. 2. Pipeline 200 has several main modules, each of which are supported by the auxiliary modules. An Abstract Syntax Tree (AST) of the code being examined is generated by preprocessor/parser module 206 for input into Stages I and II of pipeline 200, as shown in FIG. 2. Knowledge database 202 stores information regarding the various fault classes to be scanned for. Information from knowledge database 202 is fed into Stage I of the pipeline: Vulnerability Code Analyzer (VulCAn) 204. VulCAn 204 uses input from knowledge database 202, along with the AST (obtained from preprocessor/parser module 206), and runs a context-sensitive algorithm on the input. The resulting flagged vulnerabilities are passed on to Stage II of the pipeline. In Stage II, static analysis 208 is performed. As shown in FIG. 2, Stage II uses the AST, as well as the preprocessed code to obtain various graphs that can be used as the basis for the analysis.

In on embodiment of the present invention, pipeline 200 may be used to analyze several fault classes including buffer overruns, time-of-check-to-time-of-use (TOCTTOU) and other types of flaws. All the components in the pipeline are written so as to allow easy additions of more fault classes to scan for. The known fault class definitions are stored in vulnerability knowledge database 202, described herein. This flexibility provides a great benefit to the users because new fault classes can be added to the pipeline's analysis simply by updating the knowledge database with any newly identified fault classes.

Vulnerability Knowledge Database (VKdb)

A certification system according to the present invention is designed such that vulnerability knowledge database (VKdb) 202 is designed as a distinct entity. VKdb 202 stores information about code vulnerabilities, that are used in Stage I of the pipeline. Stage I is an important stage of the pipeline because this is the stage where vulnerabilities are initially flagged. Accordingly, if a potential vulnerability if is not identified in Stage I, it will not be examined in later stages. VKdb 202 is preferably designed with its own application programming interface (API such that other program modules can add and extract information from it. Also, a graphical user interface (GUI) may be included to simplify the process for industry professionals who populate the database with new vulnerabilities as they are identified.

In an embodiment of the present invention, VKdb 202 is populated with known security vulnerabilities, including, for example, buffer overrun, TOCTTOU flaws, dangerous system calls, and the like. As research in software security vulnerabilities matures, VKdb 202 may be populated with more classes of vulnerabilities. The analysis tools used in the various stages of the pipeline implement the algorithms necessary to identify these code vulnerabilities. Moreover, as new classes of vulnerabilities are identified, new analysis engines may be inserted in the pipeline.

As described above, VKdb 202 is not limited to information concerning known security vulnerabilities. In fact, VKdb 202 may be advantageously populated with code vulnerabilities related to safety and reliability failures. Also, as described above, a VKdb API may be used to capture all such vulnerabilities in a way such that they can be used by analysis engines to certify software in other essential software systems.

Stage I: VulCAn

Stage I of pipeline 200 is serves as an initial scanner for potential faults. It relies mainly on pattern matching and an AST of the code for performing its analysis. Pattern-matching analysis is the most common form of code analysis. Security-engineers within software publishing organizations today use regular-expression matching software such as grep or emacs to look for known coding flaws. VulCAn 204 leverages regular expression matching in order to perform a simple scan for known coding flaws.

The purpose behind this stage is to identify all potential vulnerabilities based on simple searches. VulCAn as 204 first obtains an AST for the code under analysis from parser module 206. It then traverses the tree scanning for matches on the various vulnerability classes it reads from vulnerability knowledge database 202.

The output from VulCAn 204 is an organized list of potential vulnerability locations that can be passed on to the second stage of the pipeline. It is important to note that not all of the vulnerabilities identified by VulCAn 204 are actual (or true) vulnerabilities. They merely point to the potential of the identified code to be possibly vulnerable to attack. More advanced stages of analysis use the list of potential vulnerabilities to perform in-depth analysis in order to determine whether a potential vulnerability is a true vulnerability.

VulCAn 204 does some standard context-sensitive analysis to eliminate vulnerabilities from the list. For example, all flagged system calls that are inside comment blocks are discarded. VulCAn 204 can also distinguish between local and global variables. Thus, if an analyst only wanted to see system calls which could potentially smash the stack, they could configure VulCAn 204 to only report these vulnerabilities. VulCAn 204 may also be configured to discard string system calls (such as strcpy) which have string literal arguments as their second parameter. Although it sometimes may be possible to overflow such a buffer, such overflows cannot presently be leveraged into exploits. By implementing such techniques the VulCAn 204 analysis demonstrates a great improvement in reducing the number of false positives that would have to analyzed by a human auditor. Of course, VulCAn 204 may be configured to identify any new vulnerabilities or later-identified exploitable problems.

Stage II: Static Analysis

In embodiments of the present invention, a static analysis of program source code is performed in order to refine the list of potentially exploitable vulnerabilities. By eliminating that code which the static analysis determines can not be exploited, the present invention reduces the human time required to audit the code. A goal of the pipeline is to pass along to the next higher stage a minimum amount of code to examine, thereby reducing future audit time and increasing audit accuracy.

Static Analysis tool 208 in Stage II of the pipeline performs complex data/control graph analysis. For buffer overflow vulnerabilities, static analysis tool 208 performs a constraints-based analysis using control flow and data dependence to evaluate a range of program states that the program can be in when the specific vulnerability is executed. Static analysis tool 208 accepts as input both the results from VulCAn 204 (i.e., Stage I) as well as files containing the system graphs for the program being evaluated. The results may be presented to a user via a GUI. Users may then select those vulnerabilities they want to analyze in further stages of the pipeline.

In a specific embodiment of the present invention, static analysis tool 208 is designed to scan explicitly for buffer overflow vulnerabilities. In this embodiment, it accepts those places in the source code identified by VulCAn 204 as potential vulnerabilities, and eliminates the ones which actually pose no threat to the system. Static analysis tool 208 may make this decision based on information obtained from the source code itself and may evaluate most, if not all, possible system states. While perfect security may not be realistically achievable, static analysis tool 208 serves to eliminate the common, well understood mistakes in security- and safety-critical programs.

One heuristic recognized in embodiments of the present invention is that most buffer overflow attacks occur on string buffers, and most string manipulations are done through the standard library calls.

A basis of static analysis tool 208's buffer-overflow analysis is a flow sensitive constraint analysis. As described herein, this constraint language was first presented by David Wagner. The goal of the constraint language is to reduce the intractably large number of possible string states into a computationally feasible form. The present invention reduces the problem of buffer overflows to an integer constraint problem.

The present invention further applies a common security heuristic to evaluate what program points are actual problems. The general heuristic employed is that a string must be longer than the memory allocated for it for a buffer overflow to occur. By reducing the problem in this fashion, perfect precision in not attainable, but this is one tradeoff to make the problem tractable for any real-world program.

Strings are represented as pairs of integer ranges. Instead of trying to maintain information about the contents of the string, embodiments of the present invention focus on the aspects of the string which are important in a buffer overflow analysis. One integer range will represent the range of possible lengths the string was assigned. The second integer range represents the range of possible memory sizes allocated for the string buffer. The standard system calls can then be represented as operations on these string ranges. The security heuristic is to guarantee that the maximum possible length for the string cannot exceed the minimum possible memory allocated for the string.

Constraint Language

The constraint language is the basis for the Stage II analysis. As described in the background section herein, the constraint language developed by Wagner was too over-simplified to be useful. Accordingly, the present invention extends Wagner's original constraint language to greatly reduce the number of false positives returned by the analysis. The invention also provides new scanning methods based on these language extensions.

The constraint language is used to model the various effects of string calls in the code. It essentially represents the mapping from code into a string representation. According to the present invention, strings may be modeled using integer range constraints (R) of the form: $[m,n]=\{i, m, n \in Z: m<i<n\}$, where Z represents the set of all integers.

Given a set S, the method of the present invention defines the range closure of S to be the minimal range R which contains S. A system of constraints is said to be satisfied when all the constraint assertions of all the members of the system evaluate to true. Wagner introduced the addition, subtraction, minimum and maximum operations into this language. Wagner has also demonstrated that every constraint system of this language has a unique solution.

Given any string s, the method of the present invention uses LEN(s) to denote the range representing the possible lengths of s, and ALLOC(s) to denote the range of possible memory allocations for s. For arithmetical convenience embodiments of the method may include the null string ("\0") in the length of the string. The standard library calls are then modeled to operate on these two quantities. So the security property to validate for s is LEN(s)<ALLOC(s). If LEN(s)=[x, y] and ALLOC(s)=[a, b], then there are three possible situations that can arise:

1. $y \leq a$; meaning the buffer will never overflow.
2. $y \leq b$; meaning the buffer overflows for all executions involving string s.
3. $a<y \leq b$; meaning it may be possible to overflow the buffer on some execution. This case is marked as a potential vulnerability.

The constraints generated for selected library calls are shown in Table 1. Constraints for conditional statements will be discussed later.

Flow Sensitivity

Static analysis 208 is flow sensitive. That is, one could imagine an N-dimensional space representing the possible program states (one dimension for each variable in the program). A single execution of the program then represents a unique walk through this space. A goal of the flow-sensitive constraint analysis is to generate boxes in this space which bound possible program states, and exclude impossible ones.

Analysis according to the present invention starts by generating control flow and data dependence graph representations for the program. Then an abstract syntax tree (AST) is constructed for the program using any suitable parser. The AST is examined for flagged standard library calls, generates the appropriate constraints and attaches them to nodes in the control flow graph. When the possible vulnerability is passed from VulCAn 204 (Stage I in pipeline 200) to static analysis tool 208, the analysis starts from that node in the control-flow graph and traces the execution backwards to the program start. Constraints are added to the list as they are encountered in backward execution path. At every program decision node, a new constraint system is potentially created (however, duplicate systems are not created in preferred embodiments). Each unique constraint system represents one "binding" box in the program state space. Every constraint system is then solved, and the security property verified.

The flow sensitive analysis is introduced to increase the accuracy of the overall analysis. Much of the inaccuracy arises from the introduction of the range closer operation over sets representing possible length and allocation values. Because each successive value assignment to the range variable makes the previous value ambiguous, it is important to separate the assignments. Through the flow sensitivity we can distinguish exactly what program statements affect the variable state at what time. Determining the statement order is one of the primary benefits of the flow sensitive analysis. Gathering flow sensitive information also allows improved communication with the human analyst, because the analysis has the ability to vaguely determine when and where the overflow occurs. This increases the effectiveness of a human code audit and reduces the audit time.

Context Sensitivity

An embodiment of the constraint language described herein contains no inherent distinction between variable uses. The language itself is not context sensitive. Notice that the strcat system call refers to itself in its constraint statement. This self-reference induces a loop in the constraint system, and because of the method the constraint solver uses to handle loops every strcat call in the code would be flagged as a potential vulnerability. To eliminate this and to further maximize the effectiveness of the flow analysis, embodiments of the present invention may distinguish each use of every program variable. In such embodiments, every use of every program variable becomes a unique constraint system variable and all unnecessary constraint system loops are eliminated.

Considering each variable use as its own range variable also enables embodiments of the present invention to consider conditional statements in the constraint system. When a conditional statement in the control flow graph is reached, embodiments of the present invention place a check in the constraint system graph which verifies that the value does not exceed the value of the conditional statement. Accordingly, the analysis need only consider inequality checks, and use their value or converse value depending on whether the control path takes the true or false edge. For example, this allows embodiments of the present invention to eliminate the flagging of a strcpy which is inside an if-block that checks the string lengths first. This is common programming practice, and the technique eliminates many false positive responses.

Constraint System Generation

To generate the constraint systems embodiments of the present invention may start at the node in the control flow graph where the vulnerability has been identified. Working backward through the flow variable constraints may be collected as they are encountered on the graph. Once the function entry point is encountered, the collection terminates and the generated constraint system is stored. The analysis then begins a backward traversal from all the places where the function call is made. This continues until the program entry node is encountered. All the possible combinations of constraint systems are then generated to form the set of all possible constraint systems for the program execution leading to the vulnerability node. Each member of this set represents unique execution paths to the vulnerability.

When a function call is encountered, embodiments of the present invention may use data dependency links to determine if the string s is data dependent upon the actual parameters to the function. If it is, then all the possible constraint systems for the function may be generated. Then the possible combinations may be merged with the current constraint system.

Scalability may be a serious concern when doing any static analysis. Since it would scale very poorly to handle global variables in this flow sensitive fashion, embodiments of the present invention may first perform a flow insensitive analysis on the global variables and use the solutions in the flow sensitive portion. The flow sensitive results are necessarily a subset of the flow insensitive results, because of the conservative nature of the constraint language. Therefore, using the global variable solutions in the flow sensitive analysis will potentially introduce some false positives, but will not will introduce any false negatives.

Pointers

As known in the art, there are certain complexity in dealing with different variables accessing the same memory location. In the general case, the problem of completely resolving pointer aliasing is NP-hard. Accordingly, a simplified embodiment may be implemented wherein most pointer operations involving aliasing complexities are ignored. In other embodiments, an exception to this simplified handling may be implemented for dealing with structs. Since structs are the only method in C of creating data structures, they are used very extensively in real world programs.

To handle the problem of struct pointers, an embodiment of the present invention may take a very conservative approach. For example, every member of variable of a struct type instance may be considered to be potentially aliased with every other instance. Thus all operations on one instance member may be applied to all other instances. This is acceptable due to the conservative nature of the constraint language. This method of handling structs may introduce some false positives, but will not introduce any false negatives.

Stage III: Dynamic Analysis

The final step in the security analysis pipeline 200 is dynamic analysis phase 210 (Stage III in FIG. 2). A purpose of dynamic analysis phase 210 is to further reduce the number of false positives returned by static analysis tool 208 by attempting to exploit vulnerabilities identified in earlier stages. Because static analysis tool 208 is a static analysis, it must necessarily make conservative assumptions to not miss any actual vulnerabilities. The more general the assumption, the more false positives will be included in the results. There are also some situations where sufficient information is not available to complete a full static analysis. The dynamic analysis aims to remove false positives and unknowns.

The pipeline approach may be used such that after static analysis tool 208 completes its static analysis, it passes to the dynamic phase all the vulnerabilities which were marked exploitable and unknown. Along with each vulnerability static analysis tool 208 also passes the constraint sets that were generated for that vulnerability. Next, dynamic analysis phase 210 will then use these constraint sets as bases for its test case generation algorithm.

A problem associated with most conventional dynamic analysis tools is the intractable size of the search space. The number of possible test cases grows very rapidly with the number of program variables. There have been many research efforts whose attempt is to solve this problem. Research has been directed at developing intelligent test cases for purposes of code coverage. The motivation of code coverage is to find as many flaws in the code as possible, because the test cases can only find flaws in the code it tests. Another method, where faults are injected directly into the code to force certain executions paths has also received a lot of attention. The dynamic analysis phase of the present invention involves elements of both examples.

A dynamic analysis phase for use in Stage III preferably executes the potential vulnerability with a maximal number of testing configurations. For example, an embodiment may use the results of the static analysis to drive the test-case generation algorithm for the dynamic section. From the static analysis for the buffer overflow a pipeline system implemented according to the present invention has knowledge of the parameters the strings in the code section are working within. Using this information the pipeline can generate test-cases designed to overflow the buffer and follow certain execution paths. The test-cases need not be implemented as program input however. Instead traditional case generation tools may be implemented to execute the program to a certain point and stop execution, saving program state. Such state information may then be used to implement the various test cases. The power of this dynamic approach is that it allows a user to test execution with many values for the program state while still ignoring all the variables that do not directly influence the values of the function parameters involved.

For the given vulnerability, embodiments of the present invention may then determine what paths/values will overflow the buffer and verify that these states are possible program states. This approach allows the user to verify that the assumptions in the static analysis were correct and provides an analysis technique for those vulnerabilities which the static step could not get enough information to solve.

Experimental Analysis

To illustrate the benefits of the present invention, an experiment was conducted in which the certification pipeline was applied to the Washington University FTP server daemon (wu-ftpd version 2.5.0). The experiment was limited to and evaluation of the file ftpd.c, which is the main part of the wu-ftpd distribution. Moreover, the results detailed below are limited to the buffer overrun class of vulnerabilities.

The first stage of the pipeline, VulCAn, identified sixty-three possible buffer overflow locations. In this experiment, VulCAn looked for those standard library calls that are prone to buffer overruns (e.g., strcpy, scanf and the like). The ITS4 tool uses a similar engine for buffer overruns and achieves approximately the same results as this analysis.

The results from VulCAn were then passed on to Stage II for static analysis of the potential vulnerabilities. The analysis in this stage resulted in sixteen locations being found to be susceptible to buffer overruns, twenty-none were found to be not over-runable, and the rest were still undetermined at the end of Stage II. Of the sixteen locations identified as buffer overruns, one was a stack-smashing buffer overrun exploit previously found and reported in a CERT Coordination Center advisory (CA 99-13), four of the vulnerabilities are the result of one particular global buffer being overrun, while the others are false positives introduced by the conservative nature of the static analysis algorithm.

Figure 3:
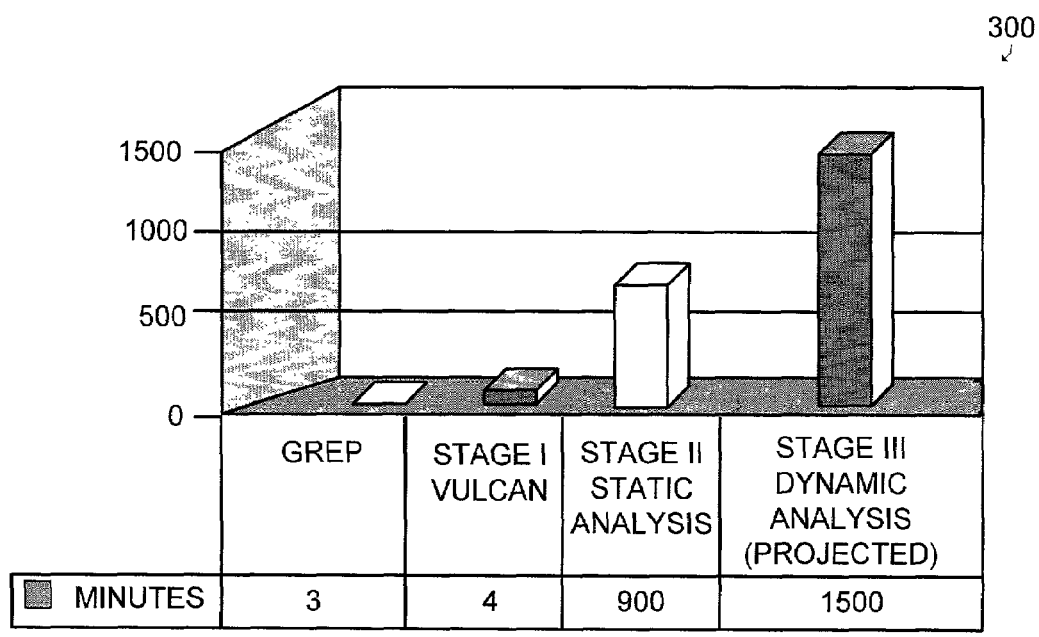
FIG. 3 is a chart showing analysis times for stages of a pipeline, according to one embodiment of the invention.

The analysis times (where computations were run on a Sun SPARC E450) for each stage of the pipeline are presented in chart 300, shown in FIG. 3. The analysis time for the grep utility are presented as a comparison. While the analysis time for the static analysis tool seems high, what is not presented is the graph of human time required for a code audit. The human time. required to hand audit each individual vulnerability can be quite high, so every false positive eliminated from the list of vulnerabilities saves vast amounts of man-power resources. For a trade-off of an over-night computation the present invention decreased the number of false-positives presented to an auditor by fifty percent. Also not shown is the increase in accuracy of the analysis, because the results from the static analysis give a human a measure of which vulnerabilities are most likely to present a problem. The auditor can then give more attention to just those vulnerabilities and the subtle program interactions that can lead to a buffer overflow. The exploitable and the undetermined results will be passed on to the dynamic analysis module, and be further processed there.

CONCLUSIONS

The present invention provides a framework for certifying software for essential and security-critical systems. The basis for the certification methodology is an analysis pipeline. The pipeline consists of separate analysis which accept the results of the previous analysis. This pipeline is centered around a vulnerability knowledge database (VKdb) which is designed to be expandable as new security information is obtained. The VKdb contains information about what code should be considered vulnerable. The VKdb allows the static analysis to be a comprehensive as possible.

The present invention also provides advanced analyses that may be implemented in later stages of the pipeline. State-of-the-practice software analysis uses conventional regular expression matching in order to identify well-known flaws. The problem with such expression matching approaches is that a large number of false positive reports result. That is, the vast majority of potential flaws turn out to not be exploitable because of the context in which the potentially unsafe code is used. The upshot is that an analyst will have to spend a large amount of time hand analyzing lots of false positives, thus reducing the utility of these tools.

The static and dynamic analyses provided in embodiments of the present invention significantly reduce the number of false positives that result from a Stage I analysis (expression matching), thereby reducing overall cost of the analysis. As demonstrated in the experimental results described herein the number of potential vulnerabilities can be cut significantly through such advanced analysis.

When used in conjunction with a comprehensive vulnerability knowledge database (i.e., one including more classes of vulnerabilities related to security-critical software, as well as safety-critical, and high-reliability applications), the present invention establishes a framework in which software systems may be certified as being safe to use in essential applications with high confidence.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for certifying software applications, said method comprising:
    (a) creating a vulnerability knowledge database comprising one or more classes of known software vulnerabilities;
    (b) applying a code parser to the software application to create an abstract syntax tree;
    (c) comparing the abstract syntax tree and the classes of known software vulnerabilities to identify a set of potential exploitable software vulnerabilities;
    (d) performing a static analysis of the source code, wherein the static analysis is a flow sensitive analysis of a list of constraints, wherein a constraint is a formal assertion describing how a program, function or procedure would affect a state of the software application if the software application were executed, and wherein the results of the static analysis comprise a set of exploitable software vulnerabilities;
    (e) performing a first dynamic analysis of the software, wherein the first dynamic analysis comprises a set of tests to achieve code coverage;
    (f) performing a second dynamic analysis of the software, wherein the second dynamic analysis comprises injecting faults into the software while being executed;
    (g) performing any two of said analysis steps in a pipelined manner; and
    (h) using the results of steps (a)-(g) as a basis for certifying the software application.

2. The method of claim 1, further comprising:
    performing a dynamic analysis of the set of exploitable software vulnerabilities to identify one or more false positives in the set of exploitable software vulnerabilities; and
    discarding the one or more false positives from the set of exploitable software vulnerabilities.

3. The method of claim 2, wherein performing the dynamic analysis comprises executing the set of potential exploitable software vulnerabilities with a maximal number of testing configurations.

4. The method of claim 1, wherein the vulnerability knowledge database is expandable.

5. The method of claim 1, wherein the set of exploitable software vulnerabilities comprises one or more of a security vulnerability, a safety vulnerability, or a reliability vulnerability.

6. A system for certifying a software applications, the system comprising:
    a vulnerability knowledge database comprising one or more classes of known software vulnerabilities;
    a code parser that creates an abstract syntax tree from the software application;
    a vulnerability code analyzer that compares the abstract syntax tree the classes of known software vulnerabilities to identify a set of potential exploitable software vulnerabilities;
    a static analysis tool that performs a static analysis of the source code, wherein the static analysis is flow sensitive analysis of a list of constraints, wherein a constraint is a formal assertion describing how a program, function or procedure would affect a state of the software application if the software application were executed, and wherein the results of the static analysis comprise a set of exploitable software vulnerabilities;
    a first dynamic analysis tool that comprises a set of tests to achieve code coverage; and
    a second dynamic analysis tool that operable to inject faults into the software while being executed,
    wherein any two of said tools are accessed in a pipelined manner, and
    wherein results generated by the system are used as a basis for certifying the software application.

7. The system of claim 6, further comprising a third dynamic analysis tool that performs a dynamic analysis of the set of exploitable software vulnerabilities to identify one or more false positives in the set of exploitable software vulnerabilities, wherein the one or more false positives are discarded from the set of exploitable software vulnerabilities.

8. The system of claim 7, wherein the third dynamic analysis tool executes the set of potential exploitable software vulnerabilities with a maximal number of testing configurations.

9. The system of claim 6, wherein the vulnerability knowledge database is expandable.

10. The system of claim 9, further comprising a user interface that enables a user to enter an additional known software vulnerability to the vulnerability knowledge database.

11. The system of claim 6, wherein the set of exploitable software vulnerabilities comprises one or more of a security vulnerability, a safety vulnerability, or a reliability vulnerability.

* * * * *